May 7, 1946.  J. S. LUCAS  2,399,813
MEASURING CUP
Filed May 30, 1944
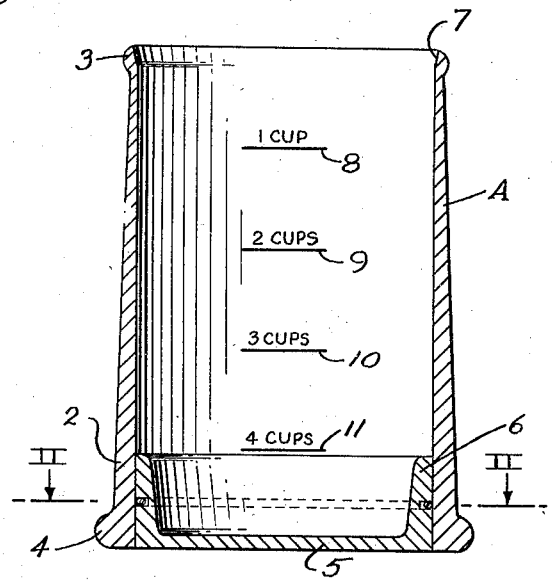
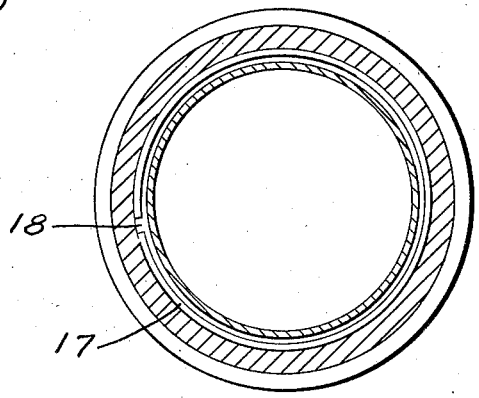
INVENTOR.
JOHN S. LUCAS
BY
Castberg & Roemer
ATTORNEYS Patented May 7, 1946

2,399,813

UNITED STATES PATENT OFFICE 2,399,813

MEASURING CUP

John S. Lucas, Santa Rosa, Calif.

Application May 30, 1944, Serial No. 538,013

2 Claims. (Cl. 73—429)

This invention relates to an adjustable measuring cup.

The object of the present invention is generally to improve and simplify the construction and operation of measuring cups; to provide a measuring cup which can be easily and quickly adjusted for measures of predetermined quantities; to provide a measuring cup which is particularly adapted for home or kitchen use, for instance, when cooking, and which is capable of handling dry materials such as flour, sugar, etc., and also liquids or semi-liquids such as fats, oils, syrups, milk, fruit juices, etc.; and further, and more specifically stated, to provide a measuring cup in the form of a tubular member having both ends open, a bottom member slidably mounted and snugly fitting the interior surface of the tube, and means carried by the bottom member for frictionally securing it in any of its adjusted positions.

The measuring cup is shown by way of illustration in the accompanying drawing, in which Fig. 1 is a central vertical section of the measuring cup, and Fig. 2 is a cross-section taken on line II—II, Fig. 1.

Referring to the drawing in detail, and particularly Fig. 1, A indicates a cylindrical or tubular body member open at both ends. The wall of the tubular member may be uniform in thickness from end to end or may be slightly tapered being thinner at the top and heavier towards the bottom as indicated at 2, and one or both ends may be provided with annular rounded flanges as shown at 3 and 4.

The interior surface of the cup or tube is smooth or finished and snugly fitting and slidably mounted within the cup is a bottom member 5 which is provided with an annular upwardly extending flange 6.

A frictional fit could be maintained between the bottom member and the interior surface of the cup but such a fit might cause binding or jamming of the bottom member due to particles entering between the contacting surfaces of the cup and bottom member. Again, such a fit would not last long as the friction would become less and less as wear takes place.

Inasmuch as it is necessary that the bottom member assumes different positions within the cup in order to measure varying quantities of dry or liquid materials, means other than the frictional fit between the bottom member of the cup must be provided to secure the bottom member in any one of its adjusted positions.

In the present instance an annular groove 17 is formed in the outer face of the flange 6 and in this groove is placed an expandable split ring 18 which exerts sufficient outward pressure to frictionally retain the bottom member in any of its adjusted positions. This ring is obviously also subjected to wear but as it is made of spring-like material it will automatically expand as wear takes place and will thus maintain a constant friction regardless of wear, and, furthermore, may readily be replaced or renewed whenever necessary.

In actual practice the cup may be made of metal, plastics, or any other similar material, and so may the bottom member. Graduations indicating 1, 2 or 3 cups as shown in Fig. 1 may be employed, or graduations in ounces or pounds may be applied to the inner surface of the cup, thus, if the housewife wants to measure two cups of sugar or the like it is only necessary to push the bottom member upwardly within the cup until its upper edge registers with the graduation mark "2 cups," etc.

The bottom member 5 may be readily removed for cleaning, etc., and as the upper end of the cup is slightly tapered or enlarged as indicated at 7, no trouble is encountered in forcing the expandable ring back into its groove when reinserting the bottom member; and while these and other features of the invention have been more or less specifically described, I nevertheless wish it understood that various changes may be resorted to within the scope of the appended claims; similarly that the materials and finish of the several parts employed may be such as the experience and judgment of the manufacturer may dictate or varying uses may demand.

Having thus described my invention, what I claim and desire to secure by Letters Patent is:

1. A measuring cup comprising a tubular member open at both ends and of uniform diameter substantially throughout, a bottom member disposed within and slidably mounted in the tube and movable from end to end thereof, an annular upwardly extending flange on the bottom member, said flange snugly fitting the interior surface of the tube and forming a guide for the bottom member, and means carried by the bottom member for frictionally resisting sliding movement within the cup.

2. A measuring cup comprising a tubular member open at both ends and of uniform diameter substantially throughout, a bottom member disposed within and slidably mounted in the tube and movable from end to end thereof, an annular upwardly extending flange on the bottom member, said flange snugly fitting the interior surface of the tube and forming a guide for the bottom member, an annular groove formed in the exterior surface of the flange, and a split spring ring disposed in the groove and exerting sufficient pressure on the inner surface of the tube to frictionally resist sliding movement of the bottom member within the tube.

JOHN S. LUCAS.